US006982863B2

(12) United States Patent
Galvagni et al.

(10) Patent No.: US 6,982,863 B2
(45) Date of Patent: Jan. 3, 2006

(54) COMPONENT FORMATION VIA PLATING TECHNOLOGY

(75) Inventors: John L. Galvagni, Surfside Beach, SC (US); Jason MacNeal, Georgetown, SC (US); Andrew P. Ritter, Surfside Beach, SC (US); Robert Heistand, II, Myrtle Beach, SC (US); Sriram Dattaguru, Myrtle Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 10/409,036

(22) Filed: Apr. 8, 2003

(65) Prior Publication Data

US 2004/0022009 A1 Feb. 5, 2004

Related U.S. Application Data

(60) Provisional application No. 60/435,218, filed on Dec. 19, 2002, and provisional application No. 60/372,673, filed on Apr. 15, 2002.

(51) Int. Cl.
*H01G 4/228* (2006.01)
*H01G 4/32* (2006.01)

(52) U.S. Cl. .................. 361/309; 361/306.3; 361/301.5

(58) Field of Classification Search .............. 361/301.4, 361/306.1, 306.2, 306.3, 308.1, 309, 301.5, 361/303–304

See application file for complete search history.

(56) References Cited

U.S. PATENT DOCUMENTS

| | | | |
|---|---|---|---|
| 369,545 | A | 9/1887 | Monroe et al. |
| 3,258,898 | A | 7/1966 | Garibotti |
| 3,448,355 | A | 6/1969 | Ahearn, Jr. et al. |

(Continued)

FOREIGN PATENT DOCUMENTS

| | | | |
|---|---|---|---|
| EP | 0351343 | | 1/1990 |
| EP | 0379066 | A3 | 7/1990 |
| GB | 1540403 | | 2/1979 |

(Continued)

OTHER PUBLICATIONS

Translated Abstract of Japanese Patent No. 002–164257 cited above.

Translated Abstract of Japanese Patent No. 6–168845 cited above.

(Continued)

*Primary Examiner*—Eric Thomas
(74) *Attorney, Agent, or Firm*—Dority & Manning, P.A.

(57) ABSTRACT

Improved terminations, interconnection techniques, and inductive element features for multilayer electronic components are formed in accordance with disclosed plating techniques. Monolithic components are provided with plated terminations whereby the need for typical thick-film termination stripes is eliminated or greatly simplified. Such plated termination technology eliminates many typical termination problems and enables a higher number of terminations with finer pitch, which may be especially beneficial on smaller electronic components. The subject plated terminations are guided and anchored by exposed varying width internal electrode tabs and additional anchor tab portions. Such anchor tabs may be positioned internally or externally relative to a chip structure to nucleate additional metallized plating material. The combination of electrode tabs and anchor tabs may be exposed in respective arrangements to form generally discoidal portions of plated material. Such plated material may ultimately form generally round portions of ball limiting metallurgy (BLM) to which solder balls may be reflowed. The disclosed technology may be utilized with a plurality of monolithic multilayer components, including interdigitated capacitors, multilayer capacitor arrays, and integrated passive components. A variety of different plating techniques and materials may be employed in the formation of the subject self-determining plated terminations and inductive components.

26 Claims, 6 Drawing Sheets

U.S. PATENT DOCUMENTS

| | | | | | |
|---|---|---|---|---|---|
| 3,809,973 | A | | 5/1974 | Hurley | |
| 3,898,541 | A | | 8/1975 | Weller | |
| 3,988,498 | A | | 10/1976 | Maher | |
| 3,992,761 | A | | 11/1976 | McElroy et al. | |
| 4,241,378 | A | | 12/1980 | Dorrian | |
| 4,266,265 | A | | 5/1981 | Maher | |
| 4,574,329 | A | | 3/1986 | Eijkelenkamp et al. | |
| 4,661,884 | A | | 4/1987 | Seaman | |
| 4,729,058 | A | | 3/1988 | Gupta et al. | |
| 4,811,162 | A | | 3/1989 | Maher et al. | |
| 4,811,164 | A | | 3/1989 | Ling et al. | |
| 4,819,128 | A | | 4/1989 | Florian et al. | |
| 4,831,494 | A | | 5/1989 | Arnold et al. | |
| 4,852,227 | A | | 8/1989 | Burks | |
| 4,919,076 | A | | 4/1990 | Lutz et al. | |
| 5,021,921 | A | | 6/1991 | Sano et al. | |
| 5,159,300 | A | | 10/1992 | Nakamura et al. | |
| 5,226,382 | A | | 7/1993 | Braden | |
| 5,251,094 | A | | 10/1993 | Amano et al. | |
| 5,311,651 | A | | 5/1994 | Kim et al. | |
| 5,369,545 | A | | 11/1994 | Bhattacharyya et al. | |
| 5,412,357 | A | | 5/1995 | Nakamura et al. | |
| 5,493,266 | A | | 2/1996 | Sasaki et al. | |
| 5,576,053 | A | | 11/1996 | Senda et al. | |
| 5,753,299 | A | | 5/1998 | Garcia et al. | |
| 5,770,476 | A | | 6/1998 | Stone | |
| 5,863,331 | A | | 1/1999 | Braden et al. | |
| 5,870,273 | A | | 2/1999 | Sogabe et al. | |
| 5,880,011 | A | | 3/1999 | Zablotny et al. | |
| 5,880,925 | A | | 3/1999 | DuPre et al. | |
| 5,944,897 | A | | 8/1999 | Braden | |
| 6,040,755 | A | | 3/2000 | Abe et al. | |
| 6,141,846 | A | | 11/2000 | Miki | |
| 6,159,768 | A | | 12/2000 | Ahn | |
| 6,188,565 | B1 | * | 2/2001 | Naito et al. | 361/303 |
| 6,191,932 | B1 | * | 2/2001 | Kuroda et al. | 361/303 |
| 6,214,685 | B1 | | 4/2001 | Clinton et al. | |
| 6,232,144 | B1 | | 5/2001 | McLoughlin | |
| 6,243,253 | B1 | | 6/2001 | DuPré et al. | |
| 6,266,229 | B1 | | 7/2001 | Naito et al. | |
| 6,292,351 | B1 | | 9/2001 | Ahiko et al. | |
| 6,310,757 | B1 | | 10/2001 | Tuzuki et al. | |
| 6,311,390 | B1 | | 11/2001 | Abe et al. | |
| 6,362,723 | B1 | | 3/2002 | Kawase | |
| 6,370,010 | B1 | | 4/2002 | Kuroda et al. | |
| 6,380,619 | B2 | | 4/2002 | Ahiko et al. | |
| 6,496,355 | B1 | | 12/2002 | Galvagni et al. | |
| 6,525,395 | B1 | | 2/2003 | Kawase et al. | |
| 6,594,136 | B2 | * | 7/2003 | Kuroda et al. | 361/306.1 |
| 6,621,682 | B1 | | 9/2003 | Takakuwa et al. | |
| 6,661,638 | B2 | | 12/2003 | Terry et al. | |
| 6,661,639 | B1 | | 12/2003 | Devoe et al. | |
| ,011,963 | A1 | | 5/2004 | Ahiko et al. | |
| ,090,733 | A1 | | 5/2004 | Devoe et al. | |
| 6,729,003 | B2 | | 5/2004 | Yokoyama et al. | |
| 6,743,479 | B2 | | 6/2004 | Kanoh et al. | |
| 6,765,781 | B2 | | 7/2004 | Togashi | |
| 6,822,847 | B2 | | 11/2004 | Devoe et al. | |
| ,057,887 | A1 | | 3/2005 | Devoe et al. | |

FOREIGN PATENT DOCUMENTS

| | | | |
|---|---|---|---|
| GB | 2334377 | A | 8/1999 |
| GB | 2389708 | A | 12/2003 |
| JP | 1313804 | | 12/1989 |
| JP | 6168845 | | 6/1994 |
| JP | 002164257 | | 6/2002 |

OTHER PUBLICATIONS

Hung Van Trinh, An Electrodeposition Method for Terminals of Multilayer Ceramic Capacitors, Mar. 23, 2002, A thesis submitted in partial satisfaction of the requirements for the degree Master of Science in Materials Science and Engineering, University of California San Diego.

Translated Abstract of Japanese Patent No. 1–313804 cited above.

European Search Report for Application No. GB0308656.8 dated May 6, 2004.

European Search Report for Application No. GB0405993.7 dated Jul. 26, 2004.

Search Report under Section 17 for Application No. GB0425963.6 dated Jan. 26, 2005, Examiner: Tyrone Moore.

Search Report under Section 17 for Application No. GB0425961.0 dated Jan. 27, 2005, Examiner: Tyrone Moore.

* cited by examiner

COMPONENT FORMATION VIA PLATING TECHNOLOGY

PRIORITY CLAIMS

This application claims the benefit of U.S. Provisional Application No. 60/372,673, entitled "PLATED TERMINATIONS", filed Apr. 15, 2002 and U.S. Provisional Application No. 60/435,218, entitled "COMPONENT FORMATION VIA PLATING TECHNOLOGY", filed Dec. 19, 2002, which are both incorporated herein by reference for all purposes.

BACKGROUND OF THE INVENTION

The present subject matter generally concerns improved component formation for multilayer electronic components. More particularly, the present subject matter relates to the utilization of plating technology in termination and inductive component formation as well as for interconnection techniques for devices such as multilayer capacitors or integrated passive components. The subject technology utilizes selective arrangements of exposed electrode tabs to facilitate the formation of plated electrical connections.

Many modern electronic components are packaged as monolithic devices, and may comprise a single component or multiple components within a single chip package. One specific example of such a monolithic device is a multilayer capacitor or capacitor array, and of particular interest with respect to the disclosed technology are multilayer capacitors with interdigitated internal electrode layers and corresponding electrode tabs. Examples of multilayer capacitors that include features of interdigitated capacitor (IDC) technology can be found in U.S. Pat. No. 4,831,494 (Arnold et al), U.S. Pat. No. 5,880,925 (DuPré et al.) and U.S. Pat. No. 6,243,253 B1 (DuPré et al.). Other monolithic electronic components correspond to devices that integrate multiple passive components into a single chip structure. Such an integrated passive component may provide a selected combination of resistors, capacitors, inductors and/or other passive components that are formed in a multilayered configuration and packaged as a monolithic electronic device.

Selective terminations are often required to form electrical connections for various monolithic electronic components. Multiple terminations are needed to provide electrical connections to the different internal electronic components of an integrated monolithic device. Multiple terminations are also often used in conjunction with IDC's and other multilayer arrays in order to reduce undesirable inductance levels. One exemplary way that multiple terminations have been formed in multilayer components is by drilling vias through selected areas of a chip structure and filling the vias with conductive material such that an electrical connection is formed among selected electrode portions of the device.

Another way of forming external terminations for the subject devices is to apply a thick film stripe of silver or copper in a glass matrix to exposed portions of internal electrode layers, curing or firing that material, and subsequently plating additional layers of metal over the termination stripes such that a part is solderable to a substrate. An example of an electronic component with external electrodes formed by fired terminations and metal films plated thereon is disclosed in U.S. Pat. No. 5,021,921 (Sano et al.). The application of terminations is often hard to control and can become problematic with reduction in chip sizes. U.S. Pat. No. 6,232,144 B1 (McLoughlin) and U.S. Pat. No. 6,214,685 B1 (Clinton et al.) concern methods for forming terminations on selected regions of an electronic device.

The ever-shrinking size of electronic components makes it quite difficult to print termination stripes in a predetermined area with required precision. Thick film termination stripes are typically applied with a machine that grabs a chip and applies selective terminations with specially designed wheels. U.S. Pat. No. 5,944,897 (Braden), U.S. Pat. No. 5,863,331 (Braden et al.), U.S. Pat. No. 5,753,299 (Garcia et al.), and U.S. Pat. No. 5,226,382 (Braden) disclose mechanical features and steps related to the application of termination stripes to a chip structure. Reduced component size or an increased number of termination contacts for an electronic chip device may cause the resolution limits of typical termination machines to become maxed out.

Other problems that can arise when trying to apply selective terminations include shifting of the termination lands, mispositioning of terminations such that internal electrode tabs are exposed or missed entirely, and missing wrap-around termination portions. Yet further problems may be caused when too thin a coating of the paint-like termination material is applied or when one portion of termination coating smears into another causing shorted termination lands. Another problem of the thick film systems is that it is often difficult to form termination portions on only selected sides of a device, such as on a vertical surface. These and other concerns surrounding the provision of electrical terminations for monolithic devices create a need to provide cheap and effective termination features for electronic chip components.

Yet another known option related to termination application involves aligning a plurality of individual substrate components to a shadow mask. Parts can be loaded into a particularly designed fixture, such as that disclosed in U.S. Pat. No. 4,919,076 (Lutz et al.), and then sputtered through a mask element. This is typically a very expensive manufacturing process, and thus other effective yet more cost efficient termination provisions may be desirable.

U.S. Pat. No. 5,880,011 (Zablotny et al.), U.S. Pat. No. 5,770,476 (Stone), U.S. Pat. No. 6,141,846 (Miki), and U.S. Pat. No. 3,258,898 (Garibotti), respectively deal with aspects of the formation of terminations for various electronic components.

Additional background references that address methodology for forming multilayer ceramic devices include U.S. Pat. No. 4,811,164 (Ling et al.), U.S. Pat. No. 4,266,265 (Maher), U.S. Pat. No. 4,241,378 (Dorrian), and U.S. Pat. No. 3,988,498 (Maher).

While various aspects and alternative features are known in the field of electronic components and terminations therefor, no one design has emerged that generally addresses all of the issues as discussed herein. The disclosures of all the foregoing United States patents are hereby fully incorporated into this application by reference thereto.

BRIEF SUMMARY OF THE INVENTION

The present subject matter recognizes and addresses various of the foregoing issues, and others concerning certain aspects of electrical terminations and related technology. Thus, broadly speaking, a principal object of some embodiments of the presently disclosed technology is improved termination features for electronic components. More particularly, the disclosed termination features are plated only and designed to eliminate or greatly simplify thick-film stripes that are typically printed along portions of a monolithic device for termination purposes.

Another principal object of some embodiments of the present subject matter is to provide a generally spiral-shaped inductor component for integration with a multilayer electronic component. More particularly, a plurality of internal conductive tab portions can be arranged on various device layers and exposed in a spiral pattern. The exposed pattern may then be subjected to a plating solution or other disclosed technologies may be used to form a plated inductive element.

Another principal object of the presently disclosed technology is to offer a way to guide the formation of plated material through the provision of internal electrode tabs and the optional placement of additional anchor tabs. Both internal electrode tabs and additional anchor tabs can facilitate the formation of secure and reliable external plating. Anchor tabs, which typically provide no internal electrical connections, may be provided for enhanced external termination connectivity, better mechanical integrity and deposition of plating materials.

Yet another principal object of some embodiments of the present subject matter is to provide termination features for electronic components whereby typical thick-film termination stripes are eliminated or simplified, and only plated terminations are needed to effect an external electrode connection. Plated materials in accordance with the disclosed technology may comprise metallic conductors, resistive materials, and/or semi-conductive materials.

Another principal object of some embodiments of the present subject matter is to provide termination features for electronic components whereby ball limiting metallurgy (BLM) is created directly without the need to first provide termination stripes. Such ball-limiting metallurgy can be plated in accordance with the present technology in a variety of predetermined shapes and sizes.

A resultant advantage of some embodiments of the disclosed subject matter is that termination features for electronic components can be effected without the need for application by termination machinery, thus providing an ability to yield external terminations with resolution levels that may otherwise be unattainable. Such improved termination resolution also enables the provision of more terminations within a given component area and terminations with a much finer pitch.

Another object of some embodiments of the present technology is to provide termination features that enable an effective solder base with reduced susceptibility to solder leaching. Configuration of exposed electrode portions and anchor tab portions is designed such that selected adjacent exposed tab portions are decorated with plated termination material without undesired bridging among distinct termination locations. In fact, by altering the plating parameters by methods known in the art, one can tailor the degree of creep or spreading of the plating to bridge gaps between exposed electrode portions or to leave them separated.

Yet another object of the present subject matter is that the disclosed technology can be utilized in accordance with a myriad of different termination configurations, including varied numbers and placement of external terminations. Plated terminations can be formed in accordance with a variety of different plating techniques as disclosed herein at locations that are self-determined by the provision of exposed conductive elements on the periphery of an electronic component.

A still further object of the subject plated component formation technology is to facilitate the production of cheaper and more effective electronic components in an expedient and reliable manner.

Additional objects and advantages of the present subject matter are set forth in, or will be apparent to those of ordinary skill in the art from, the detailed description herein. Also, it should be further appreciated by those of ordinary skill in the art that modifications and variations to the specifically illustrated, referenced, and discussed features and/or steps hereof may be practiced in various embodiments and uses of the disclosed technology without departing from the spirit and scope thereof, by virtue of present reference thereto. Such variations may include, but are not limited to, substitution of equivalent means, steps, features, or materials for those shown, referenced, or discussed, and the functional, operational, or positional reversal of various parts, features, steps, or the like.

Still further, it is to be understood that different embodiments, as well as different presently preferred embodiments, of this technology may include various combinations or configurations of presently disclosed steps, features or elements, or their equivalents (including combinations of features or configurations thereof not expressly shown in the figures or stated in the detailed description).

Broad aspects of the present subject matter relate to plated terminations for a multilayer electronic component. Such a multilayer electronic component may preferably include a plurality of insulating substrates with a plurality of electrodes interleaved among the plurality of substrates. Selected of the plurality of electrodes preferably have a plurality of tab portions extending from selected portions and exposed along selected sides of the plurality of substrates. Selected of the exposed electrode tab portions are preferably stacked within predetermined distances of one another such that at least one layer of plated termination material may be formed along the periphery of the electronic component.

Additional general aspects of the present technology relate to anchor tabs for use with such aforementioned plated terminations. Anchor tabs may be additionally interleaved within the plurality of substrates of a multilayer electronic component and exposed at predetermined locations such that the formation of plated terminations is guided by the location of the exposed internal electrode tab portions and the exposed anchor tabs. With the provision of a sufficient number of exposed tabs, the formation of a plated termination is possible. Further, the anchor tabs provide greater mechanical strength to the final termination.

A first embodiment of the present technology concerns a multilayer electronic component having internal electrodes wherein selected of the internal electrode layers have tabs of varied width associated with the electrode layers. Such first embodiment of the present technology may include internal electrical vias to connect the various electrode layers. The first embodiment of the present technology may also include anchor tabs, in accordance with general aspects of the disclosed technology, wherein the anchor tabs may also be characterized by varied width. The varied tab widths may facilitate the formation of generally discoidal plated layer portions along the periphery of the multilayer electronic component.

A second embodiment of the present technology concerns a multilayer electronic component similar to the first embodiment and also including additional tabs associated with the electrode layers. The additional tabs extend in a direction opposite to selected of the electrode tabs mentioned with respect to the first embodiment and may be exposed at a selected surface of the multilayer electronic component. The additional tabs preferably are plated, or otherwise joined by standard thick film techniques, at the selected external surface and act as connection points for the internal electrodes, test terminals for the multilayer electronic component, and as expedients for the possible later electrochemical plating process.

A third embodiment of the present technology concerns a multilayer electronic component similar to the first embodiment and featuring additional electrode tabs that extend from selected electrode layers to multiple selected sides of the multilayer electronic component. As with the second embodiment, these additional tabs may be plated externally on the multilayer electronic component and act as connection points for the internal electrodes as well as test terminals for the multilayer electronic component.

Yet another aspect of the present subject matter that may be incorporated with selected of the aforementioned exemplary embodiments of the present subject matter and others involves alternative features for forming a portion of plated material in a desired shape. An internal electrode configuration permits shaping the resulting termination by shifting a shaped pattern progressively toward the cut surface which forms the termination edge. For example, if the end of a tab is shaped as a semicircle, then by exposing cross-sections of that shape and moving that shape each time by the thickness of the layer toward the surface to be cut, stopping at the center of the circle, the resultant pattern will trace out a semi-circle. If the shape is a triangle, the resultant termination will be a triangle, and so forth.

A still further aspect of the present subject matter that may be incorporated with select embodiments involves the formation of an internal inductor component. By printing a plurality of tabs that intersect the outer diameter of a via (to be drilled at a later time), and respectively rotating the position of each subsequently layered tab around the circumference of the via, a series of tabs will be exposed which form the path of a spiral. Subsequent plating will bridge those tabs, and form an actual spiral, which provides an inductor, a useful passive component addition.

Additional embodiments of the present subject matter, not necessarily expressed in this summarized section, may include and incorporate various combinations of aspects of features or parts referenced in the summarized objectives above, and/or features or parts as otherwise discussed in this application.

The present subject matter equally concerns various exemplary corresponding methodologies for practice and manufacture of all of the herein referenced multilayer electronic component configurations and related plated termination technology.

Those of ordinary skill in the art will better appreciate the features and aspects of such embodiments, and others, upon review of the remainder of the specification.

BRIEF DESCRIPTION OF THE SEVERAL VIEWS OF THE DRAWING

A full and enabling description of the present subject matter, including the best mode thereof, directed to one of ordinary skill in the art, is set forth in the specification, which makes reference to the appended figures, in which.

Figure 1:
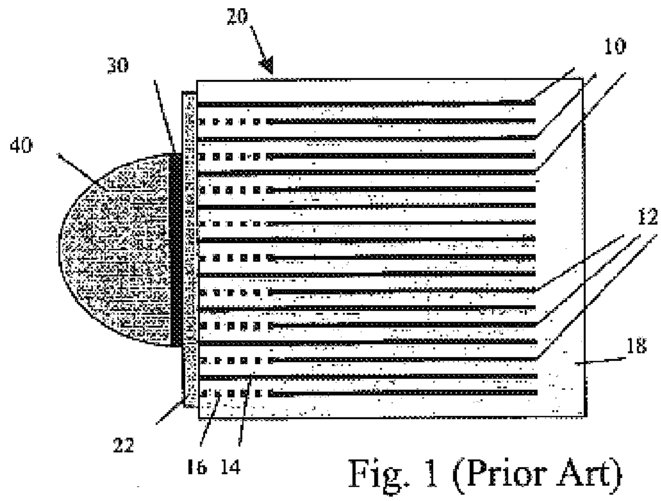
FIG. 1 illustrates a side cross-sectional view of an exemplary multilayer interdigitated capacitor according to a known arrangement.

Repeat use of reference characters throughout the present specification and appended drawings is intended to represent same or analogous features or elements of the invention.

DETAILED DESCRIPTION OF THE EMBODIMENTS

As previously referenced, the present subject matter generally concerns improved component formation for multilayer electronic components. More particularly, the present subject matter relates to the utilization of plating technology in termination and inductive component formation as well for interconnection techniques for devices such as multilayer capacitors or integrated passive components. The subject technology utilizes selective arrangements of exposed electrode tabs to facilitate the formation of plated electrical connections. The present subject matter concerns both the apparatuses embodied by such multilayer components as well as corresponding methodology for forming such components and the plated features therefor.

The subject component formation technology utilizes exposed electrode portions of structures such as monolithic capacitor arrays, multilayer capacitors including those with interdigitated electrode configurations, integrated passive components, and other electronic chip structures. Additional anchor tabs may be embedded within such monolithic components to provide stacked pluralities of exposed internal conductive portions to which plated terminations or interconnections may be formed and securely positioned along external surfaces of a device.

Figure 2:
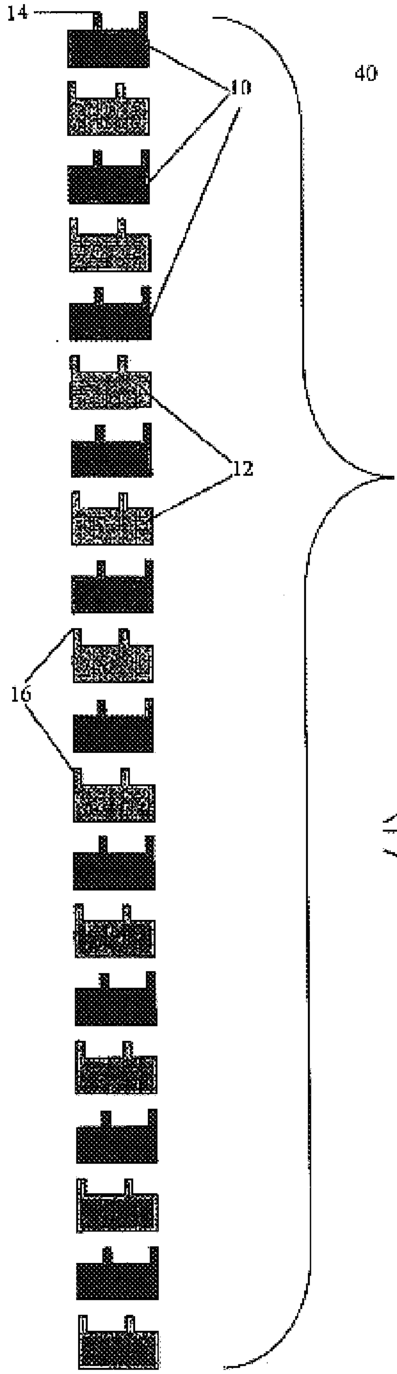
FIG. 2 illustrates an exploded plan view of a plurality of exemplary electrode layers for use in the multilayer interdigitated capacitor corresponding to the arrangement of FIG. 1.
Figure 3:
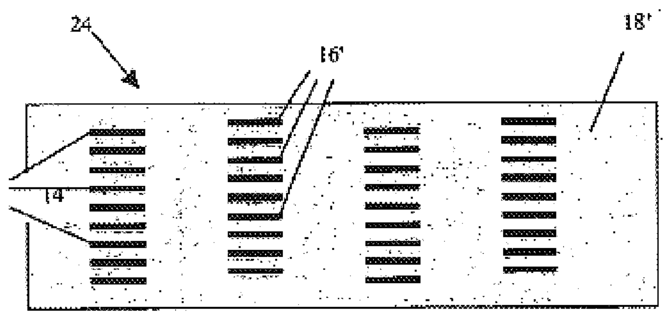
FIG. 3 illustrates a front plan view of an exemplary multilayer interdigitated capacitor with a known electrode layer configuration such as in FIGS. 1 and 2, further having tab portions exposed in accordance with broader aspects of the present subject matter for application of the presently disclosed plated terminations.
Figure 4:
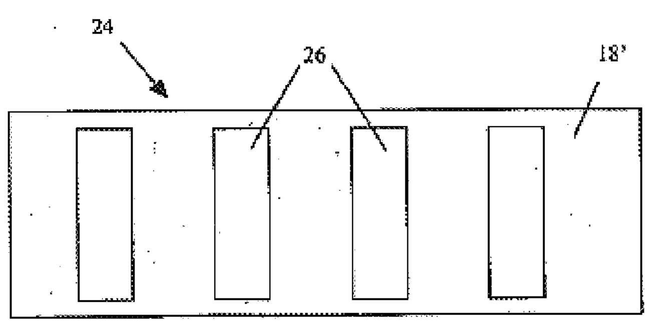
FIG. 4 illustrates a front plan view of an exemplary multilayer interdigitated capacitor such as represented in FIG. 3 with plated terminations in accordance with the present subject matter.
Figure 13:
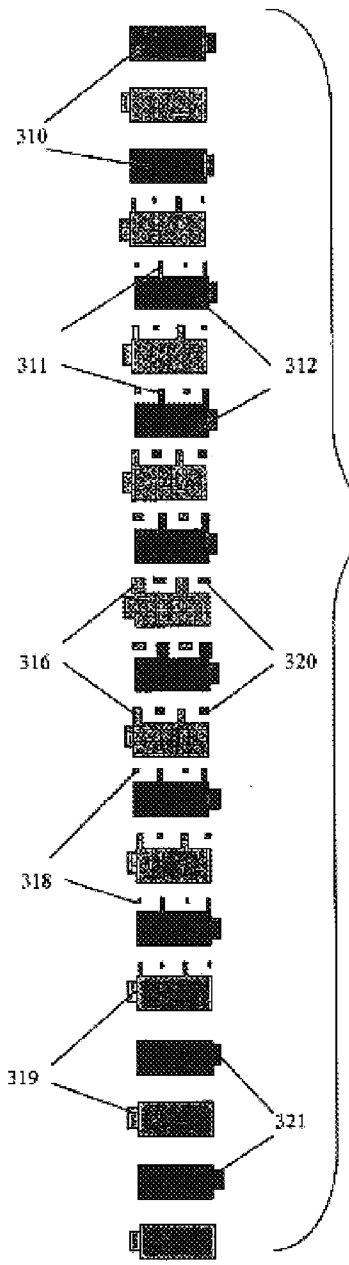
FIG. 13 illustrates an exploded plan view of a plurality of exemplary electrode layers for use with the multilayer interdigitated capacitor of FIG. 12 in accordance with the present subject matter.
Figure 14:
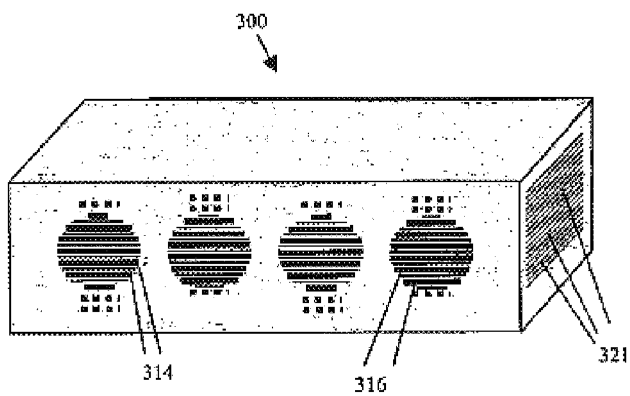
FIG. 14 illustrates a generally front perspective view of a multilayer interdigitated capacitor with an electrode layer configuration such as in FIGS. 12 and 13 in accordance with the present subject matter.
Figure 19:
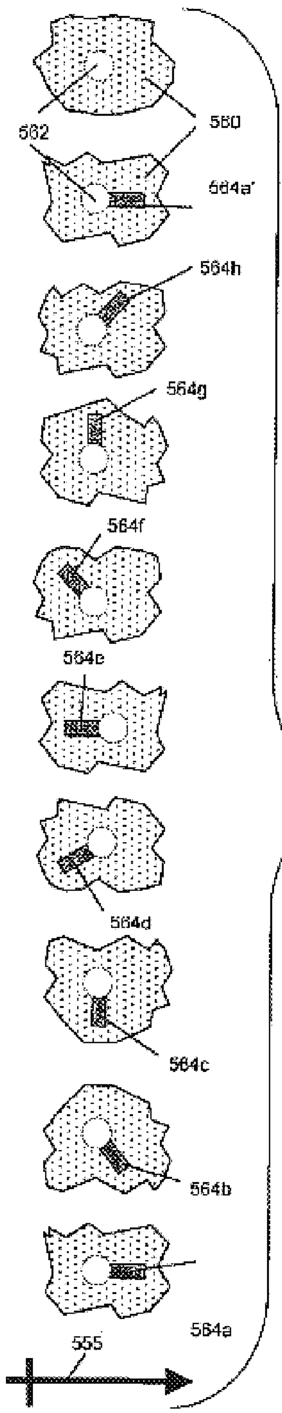
FIG. 19 illustrates an exploded plan view of a multilayered tab configuration for use in embodiments of the present subject matter, whereby successive layers are designed to be superimposed on each other in the order shown, yielding respective concentrically positioned tabs around a common via location.
Figure 20:
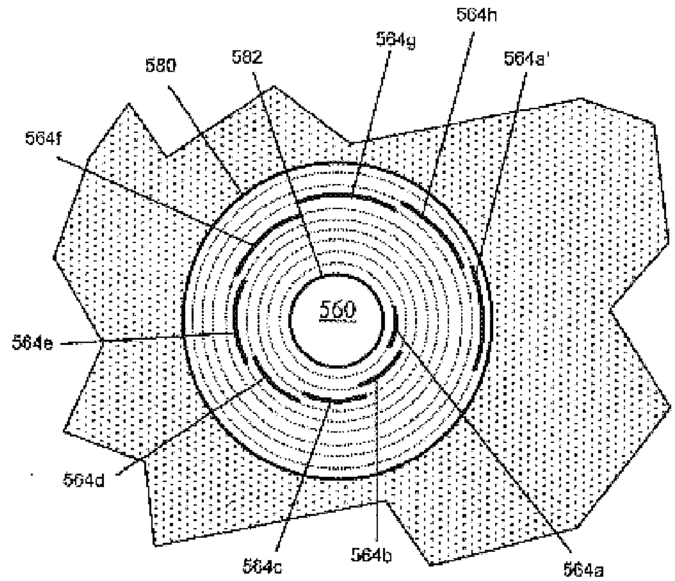
FIG. 20 illustrates a modified plan view of the exemplary layers of FIG. 20 stacked in succession around the same common via location, wherein the perspective is warped to show how the exposed sectioned tabs may look if one peers down through the common via location.
Figure 21:
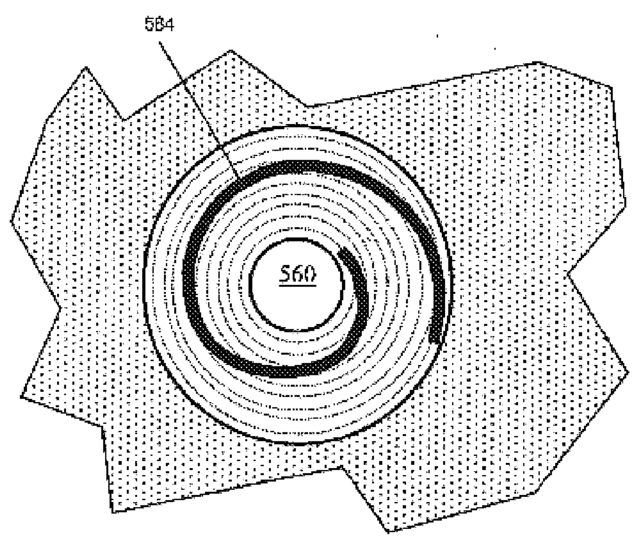
FIG. 21 depicts a modified plan view, similar in perspective to FIG. 20, wherein a continuous spiral path is formed among the exposed sectioned tabs in accordance with the subject plating technology to create an inductive current path.

The subject plating technology and exposed tab features may be utilized in accordance with a plurality of different monolithic components. FIGS. 3 and 4 combine known aspects of multilayer capacitor designs (such as depicted in FIGS. 1 and 2) with the subject plated termination technology to depict broader aspects of the present subject matter. FIGS. 5 through 8 respectively represent a first exemplary embodiment of the present technology featuring aspects of an interdigitated electrode layer configuration wherein electrode tabs of varied width generally extend to and are exposed on a selected side of a multilayer component. These and other aspects of plated terminations in accordance with the present subject matter are thereafter presented with respect to FIGS. 9 through 11, which concern a second exemplary multilayer capacitor embodiment with exposed conductive portions on two selected sides of the capacitor. FIGS. 12 through 14 respectively illustrate aspects of a third exemplary embodiment of the disclosed technology with an electrode layer configuration having electrode tabs for exposure on multiple selected sides of a device. FIGS. 15 through 18 describe alternative features for forming the exposed terminations with varied width as variously depicted in FIGS. 5–14, respectively. FIGS. 19 through 21 depict the formation of an inductive spiral by unique geometrical means in combination with the subject plated termination technology.

It should be noted that each of the exemplary embodiments as presented herein should not insinuate limitations of the disclosed technology. Features illustrated or described as part of one embodiment can be used in combination with another embodiment to yield further embodiments. Additionally, certain features may be interchanged with similar devices or features not mentioned yet which perform the same, similar or equivalent function.

Referring now to the drawings, FIG. 2 illustrates a known exemplary configuration of electrode layers 10 and 12 with respective electrode tabs 14 and 16 for use in a multilayer interdigitated capacitor or capacitor array. Electrode layers are generally arranged in a stacked multilayer arrangement within a body of dielectric material 18 (such as in FIG. 1) with tabs 14 and 16 extending from the layers such that electrode tabs extending from alternating electrode layers 10 and 12 are aligned in respective columns. The exemplary illustration of FIG. 2 depicts twenty such electrode layers with corresponding tabs 14 and 16, but arrangements as utilized with the present technology may in some instances contain more or less electrode layers and numbers of respective tabs. This feature provides the option of creating capacitive elements with a large range of capacitance values (by choosing a relatively large number of electrodes).

The exemplary electrode layer configuration of FIG. 2 is not representative of a finished capacitor embodiment. Instead, FIG. 2 provides a reference for an intermediate aspect of exemplary capacitor and capacitor array configurations. The electrode layer configuration of FIG. 2 can be utilized in accordance with an exemplary multilayer interdigitated capacitor such as displayed in FIG. 1.

An interdigitated capacitor typically consists of a plurality of electrode layers, such as those shown in FIG. 2 disposed in a body of dielectric material 18, such as seen in the exemplary interdigitated capacitor (IDC) configuration 20 of FIG. 1. Electrode layers 10 and 12 are disposed in the dielectric material 18 such that electrode tabs 14 and 16 extend to and are exposed at a selected side of IDC embodiment 20. Exemplary materials for such electrode layers may include platinum, nickel, a palladium-silver alloy, or other suitable conductive substances. Dielectric material 18 may comprise barium titanate, zinc oxide, alumina with low-fire glass, or other suitable ceramic or glass-bonded materials. Alternatively, the dielectric may be an organic compound such as an epoxy (with or without ceramic mixed in, with or without fiberglass), popular as circuit board materials, or other plastics common as dielectrics. In these cases the conductor is usually a copper foil which is chemically etched to provide the patterns.

A multilayer IDC component 20 such as that of FIG. 1 that incorporates the known exemplary electrode layer configuration of FIG. 2 is characterized by electrode portions 14 and 16 that are exposed on a selected side of IDC component 20. Other exemplary internal electrode configurations may be employed in a multilayer component such that internal electrode portions are exposed at different locations and/or on different numbers of sides of the device.

For example, consider the exemplary internal electrode layer configuration illustrated in the exploded view of FIG. 2. Alternating electrode layers 10 and 12 are provided with uniform width electrode tab portions 14 and 16 extending toward a single selected direction. Electrode tabs 14 and 16 for each set of alternating electrode layers are preferably arranged in a stacked configuration such that, for instance, tabs 14 from electrode layers 10 are aligned in respective columns and tabs 16 from electrode layers 12 are aligned in respective columns, wherein such tabs preferably extend to and are exposed on a single selected side of IDC 24.

Referring again to FIG. 1, a typical conventional termination for IDC embodiment 20 and for other monolithic electronic components comprises a printed and fired thick-film stripe 22 of silver, copper, or other suitable metal in a glass matrix, on top of which is plated a layer of nickel to promote leach resistance, and is followed by a layer of tin or solder alloy which protects the nickel from oxidation, and promotes an easily soldered termination.

A thick-film stripe 22 in accordance with such type of termination also typically requires printed application by a termination machine and printing wheel or other suitable component to transfer a metal-loaded paste. Such printing hardware may have resolution limits that make it hard to apply thick-film stripes, especially to smaller chips. A typical existing size for an IDC 20 or other electronic component is about one hundred and twenty mils (thousandths of an inch) by sixty mils along the two opposing sets of sides with a thickness from top to bottom layers of about thirty mils. When more than four terminations need to be applied to a part this size or terminations are desired for a part with smaller dimensions, the resolution levels of specialized termination machinery often becomes a limitation in applying effective termination stripes.

The preceding describes the so-called thick film preparation technique for the termination stripe 22. A more common method involves "thin-film" processing, which we describe below. According to one known technology, a first step in this preparation is achieved by first polishing the contact surface of the component 20. Thereafter, the monolithic component is mounted in a special fixture, usually along with many others, and a "shadow mask" is placed in precise registry above them. Chrome or similar non-solder-wettable metal or alloy is evaporated or sputtered through the mask to effect a termination stripe or island 22, analogous to the thick film version. Following the application of the termination stripe 22, either by thick or thin film techniques, the monolithic component is remasked and placed in another evaporation fixture where a layer of chrome, copper and gold alloy (Cr—Cu—Au) is evaporated onto the previously created chrome islands. This evaporation step is followed by yet another evaporation step, this time of a tin/lead (Sn/Pb) alloy. Alternative methods are known for this step, such as electroplating the alloy, or physically placing a solder-ball preform onto the BLM contact 30. Following this final evaporation, the monolithic component is placed in a hydrogen or other reducing atmosphere at elevated temperatures so as to reflow the tin/lead layer to allow formation of the desired solder balls 40. Monolithic components made according to this process are then inspected and tested. Unfortunately the testing process distorts the soft solder balls 40 so that the components that test "good" must be further processed to reflow the tin/lead alloy to reform the solder balls. As can be appreciated, this process is not only time consuming but quite expensive to perform.

The present subject matter offers a termination arrangement that eliminates or greatly simplifies the provision of such typical thick-film termination stripes. By eliminating the less-controlled thick film stripe, the need for typical termination printing hardware is obviated. Termination features in accordance with the known technology focus more on the plated layer of nickel, tin, copper, etc. that is typically formed over a thick-film termination stripe.

Consider the exemplary capacitor array configuration 24 presented in FIG. 3. Capacitor array 24 is characterized by a plurality of internal electrodes and corresponding electrode tabs 14' and 16' (exposed portions of which are represented by the solid lines in FIG. 3) which are similar to the electrode tabs 14 and 16 of FIGS. 1 and 2 and which are embedded in a body of dielectric material 18'. By subjecting capacitor array 24 or other electronic component with similarly exposed electrode tabs to an electroless plating solution, for example nickel or copper ionic solution, the formation of plated terminations 26 in accordance with the present subject matter, such as is shown in FIG. 4, is preferably effected. Exposure to such solution enables the exposed electrode tabs 14' and 16' to become deposited with nickel, copper, tin or other metallic plating. The resulting deposition of plated material is preferably enough to effect an electrical connection between adjacent electrode tabs 14' and 16' in a stacked column.

In some exemplary embodiments of the disclosed technology, the distance between adjacent electrode tabs in a column of tabs should be no greater than about ten microns to ensure proper and continuous plating. The distance between adjacent columnar stacks of electrode tabs should thus be greater by at least a factor of 2 than this minimum distance to ensure that distinct terminations 26 do not run together. In some embodiments of the present technology, the distance between adjacent columnar stacks of exposed metallization is about four times the distance between adjacent exposed electrode tabs in a particular stack. By controlling the distance between exposed internal conductor portions, termination connectivity can be manipulated to form bridged or non-bridged terminations depending on the desired termination configuration.

Plated terminations 26 are thus guided by the positioning of the exposed electrode tabs 14' and 16'. This phenomena is hereafter referred to as "selfdetermining" since the formation of plated terminations 26 is determined by the configuration of exposed metallization at selected peripheral locations on a multilayer component, or capacitor array, 24. The exposed internal electrode tabs 14' and 16' also help to mechanically adhere terminations 26 to the periphery of capacitor array 24. Further assurance of complete plating coverage and bonding of the metals may be achieved by including resistance-reducing additives in the plating solution. A still further mechanism for enhancing the adhesion of metallic deposit that forms the subject plated terminations is to thereafter heat the component in accordance with such technologies as baking, laser subjection, UV exposure, microwave exposure, arc welding, etc.

The plated terminations 26 of FIG. 4 may be sufficiently formed for some component applications, but sometimes the exposed metallization from internal electrode tabs is insufficient to form the self-determining terminations of the present technology. In such case, it may be beneficial, and in some cases necessary, to provide additional anchor tabs embedded within select portions of a multilayer capacitor. Anchor tabs are short conductive tabs that typically offer no electrical functionality or internal connectivity to a component, but mechanically nucleate and secure additional plated termination along the periphery of a monolithic device. Exposed anchor tabs in combination with exposed internal electrode portions can provide sufficient exposed metallization to create more effective and more evenly shaped self-determining terminations.

There are several different techniques that can potentially be used to form plated terminations, such as terminations 26 on multilayer capacitor embodiment 24 of FIG. 4. As previously addressed, a first method corresponds to electroplating or electrochemical deposition, wherein an electronic component with exposed conductive portions is exposed to a plating solution such as electrolytic nickel or electrolytic tin characterized by an electrical bias. The component itself is then biased to a polarity opposite that of the plating solution, and conductive elements in the plating solution are attracted to the exposed metallization of the component. Such a plating technique with no polar biasing is referred to as electrolytic plating, and can be employed in conjunction with electroless plating solutions such as nickel or copper ionic solution.

In accordance with electrochemical deposition and electroless plating techniques, a component such as IDC 24 of FIG. 4, is preferably submersed in an appropriate plating solution for a particular amount of time. With certain embodiments of the present subject matter, no longer than fifteen minutes is required for enough plating material to deposit at exposed conductive locations along a component such that buildup is enough to spread the plating material in a perpendicular direction to the exposed conductive locations and create a connection among selected adjacent exposed conductive portions.

Another technique that may be utilized in accordance with the formation of the subject plated terminations involves magnetic attraction of plating material. For instance, nickel particles suspended in a bath solution can be attracted to similarly conductive exposed electrode tabs and anchor tabs of a multilayer component by taking advantage of the magnetic properties of nickel. Other materials with similar magnetic properties may be employed in the formation of plated terminations.

A still further technique regarding the application of plated termination material to exposed electrode tabs and anchor tabs of a multilayer component involves the principles of electrophoretics or electrostatics. In accordance with such exemplary technology, a bath solution contains electrostatically charged particles. An IDC or other multilayer component with exposed conductive portions may then be biased with an opposite charge and subjected to the bath solution such that the charged particles are deposited at select locations on the component. This technique is particularly useful in the application of glass and other semiconductive or nonconductive materials. Once such materials are deposited, it is possible to thereafter convert the deposited materials to conductive materials by intermediate application of sufficient heat to the component.

One particular methodology for forming plated terminations in accordance with the present technology relates to a combination of the above-referenced plating application techniques. A multilayer component may first be submersed in an electroless plating solution, such as copper ionic solution, to deposit an initial layer of copper over exposed tab portions, and provide a larger contact area. The plating technique may then be switched to an electrochemical plating system which allows for a faster buildup of copper on the selected portions of such component.

In accordance with the different available techniques for plating material to exposed metallization of a multilayer component in accordance with the present technology, different types of materials may be used to create the plated terminations and form electrical connections to internal features of an electrical component. For instance, metallic conductors such as nickel, copper, tin, etc. may be utilized as well as suitable resistive conductors or semi-conductive materials, and/or combinations of selected of these different types of materials.

A still further plating alternative corresponds to forming a layer of metallic plating, and then electroplating a resistive alloy over such metallic plating. Plating layers can be provided alone or in combination to provide a variety of different plated termination configurations. A fundamental of such plated terminations is that the self-determining plating is configured by the design and positioning of exposed conductive portions along the periphery of a component.

Such particular orientation of internal electrode portions and anchor tabs may be provided in a variety of different configurations to facilitate the formation of plated terminations in accordance with the present subject matter. More particular exemplary embodiments of the present technology are hereafter presented to provide more detailed representation of exemplary of such configurations.

Figure 5:
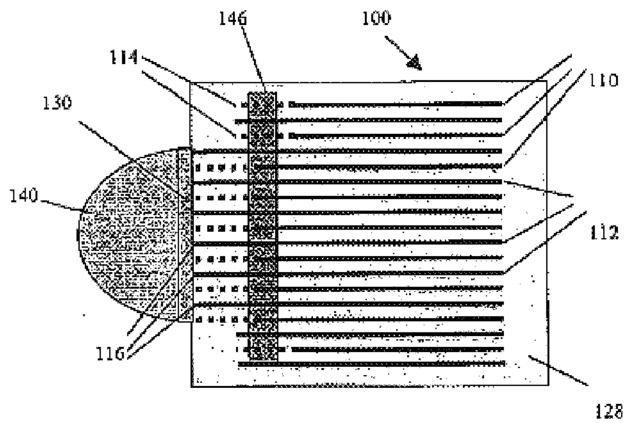
FIG. 5 illustrates a side cross-sectional view of an exemplary multilayer interdigitated capacitor according to a first embodiment of the present subject matter.

With specific reference to FIGS. 5–8 respectively, a first embodiment of the present subject matter is illustrated. Differences between the known technology and such first embodiment of the present technology can most easily be seen by comparing FIGS. 5–6 with FIGS. 1–2 respectively. More particularly, the first exemplary embodiment of the present technology 100 as depicted in FIG. 5 is distinguished by its absence of an equivalent to the thick or thin film terminations 22 illustrated in FIG. 1. The present technology allows for the omission of the termination stripe 22 due, in part, to the morphing configurations of the electrode tabs 114 and 116.

Figure 6:
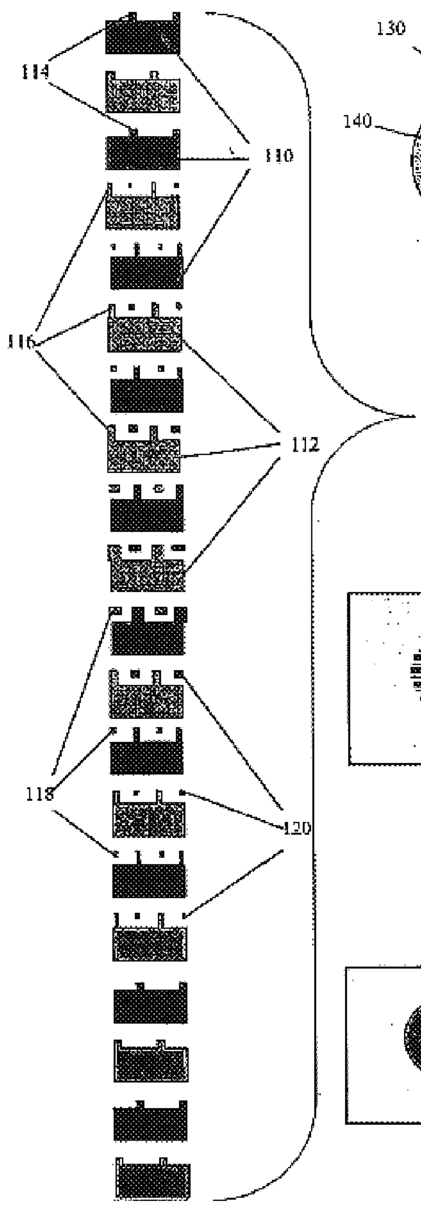
FIG. 6 illustrates an exploded plan view of a plurality of exemplary electrode layers for use in the multilayer interdigitated capacitor embodiment of FIG. 5 in accordance with the present subject matter.
Figure 7:
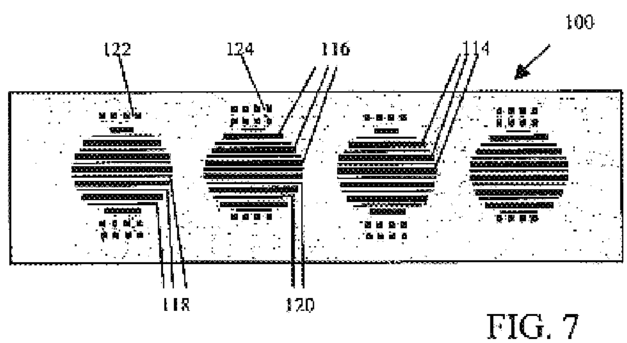
FIG. 7 illustrates a front plan view of an exemplary electrode layer configuration for a multilayer interdigitated capacitor corresponding to the embodiment of FIGS. 5 and 6 in accordance with the present subject matter.
Figure 8:
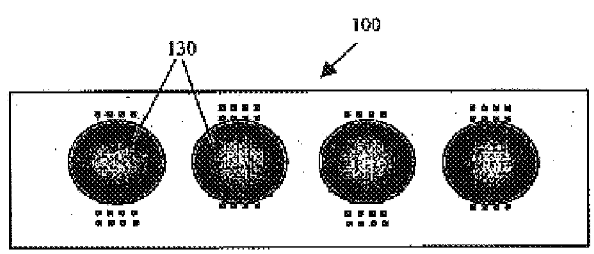
FIG. 8 illustrates a front plan view of an exemplary electrode layer configuration for a multilayer interdigitated capacitor corresponding to the embodiment of FIGS. 5, 6, and 7 with the application of plating layers in accordance with the present subject matter.

With reference to FIGS. 5, 6 and 7, electrodes 110 and 112 of monolithic interdigitated capacitor (IDC) 100 are stacked in an alternating series and are configured with tabs 114 and 116 extending toward a selected side of the capacitor. Tabs 114 and 116 vary in both length and width. As can more clearly be seen from FIGS. 5 and 6, the tabs 114 and 116 from selected uppermost and lowermost layers 110 and 112 are somewhat shorter than the tabs from more central layers and, as such, are not exposed at a surface of the insulating material 128 as are the more central tabs. Additionally, as can be more clearly seen from FIGS. 6 and 7, tabs 114 and 116 are made to vary in width so that the exposed end surfaces of the tabs on the central most electrode layers form respective circular patterns as most clearly seen in FIG. 7.

With continued reference to FIGS. 6 and 7, additional tabs 118 and 120 are illustrated. These tabs are anchor tabs similar to those previously mentioned in that they are typically electrically isolated from the active electrode tabs 114 and 116 and contribute substantially no electrical function to the IDC. These anchor tabs may vary in width in a manner similar to the active electrode tabs and function with the active electrode tabs as anchor points for the plating layer portions 130 (of FIG. 8) and as additional nucleation points for the plating layer portions during the actual plating process. Exposed anchor tabs in combination with exposed active electrode portions can provide sufficient exposed metallization to create more effective self-determining plating layers 130. As a result of the operation of the self-determining circular plating resulting from the varying widths of the active and anchor tabs, ball limiting metallurgy is directly provided in a significantly easier and cheaper manner.

Referring again to FIGS. 5 and 7, as previously noted, a portion of the electrode tabs 114 and 116 attached to electrodes 110 and 112 are shorter than others of the electrode tabs. These shorter tabs do not reach the surface of the IDC 100 as illustrated by the dotted lines 122 and 124 of FIG. 7. In order to electrically connect the electrodes associated with these shorter tabs to the other electrodes of the IDC 100, at least one internal via 146 is provided. The IDC 100 may be completed by providing a solder ball 140 on selected portions of BLM 130. It should be appreciated that while only one internal via 146 and one solder ball 140 is depicted in the illustration of FIG. 5, a plurality of such vias (for instance, one per arranged column of electrode tabs 114 or 116) and solder balls may preferably be utilized with the subject IDC 100.

Solder balls 140 as applied to the plated BLM portions 130 may render a part compatible with BGA mounting technology for connecting the completed IDC to other components including printed wiring boards or other substrate environments. Solder balls 140 may be formed by first evaporating a lead alloy onto the plating layer 130, which acts as a ball limiting metallurgy. Alternative methods for accomplishing this have been described above, which include electroplating the solder alloy onto the BLM contact, or physically placing a solder perform onto it. After the lead alloy is evaporated onto the plating layer, the IDC is heated in a Hydrogen, reducing, or neutral atmosphere to allow the lead alloy to reflow without oxidation. The reflowing of the lead alloy solder, because of the surface tension of the molten material, forms the solder into a ball configuration.

Figure 9:
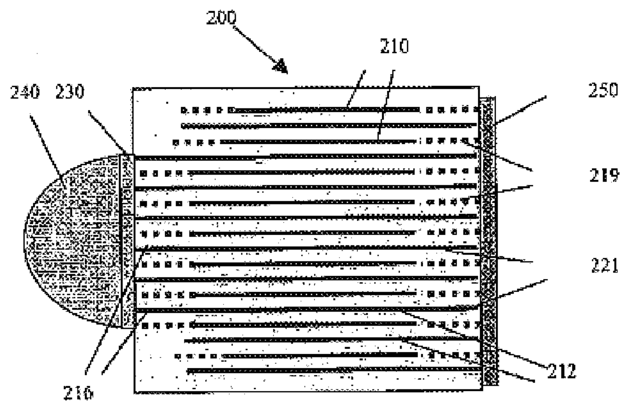
FIG. 9 illustrates a side cross-sectional view of an exemplary multilayer interdigitated capacitor according to a second embodiment of the present subject matter.
Figure 10:
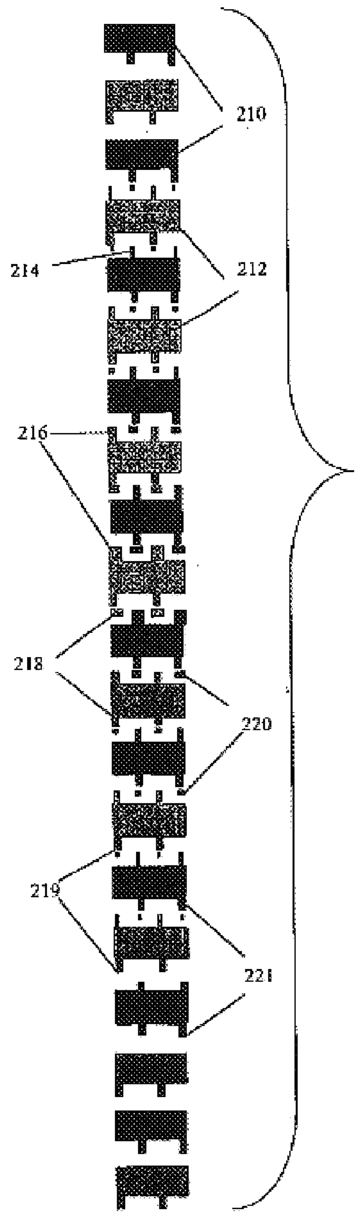
FIG. 10 illustrates an exploded plan view of a plurality of exemplary electrode layers for use in the multilayer interdigitated capacitor embodiment of FIG. 9 in accordance with the present subject matter.
Figure 11:
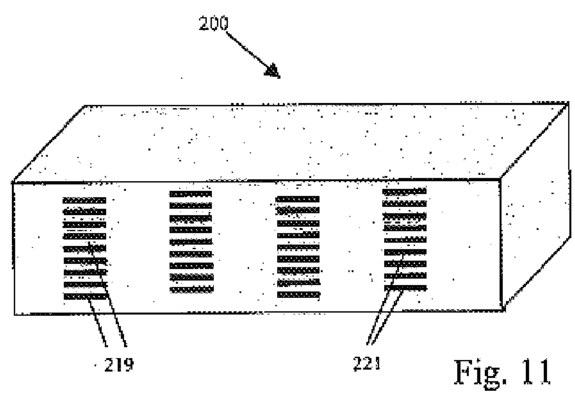
FIG. 11 illustrates a rear perspective view of an exemplary multilayer interdigitated capacitor with an electrode layer configuration such as in FIGS. 9 and 10 in accordance with the present subject matter.
Figure 12:
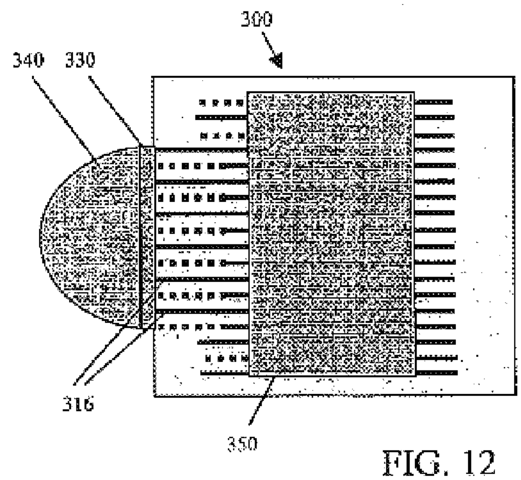
FIG. 12 illustrates a side view of an exemplary multilayer interdigitated capacitor according to a third embodiment of the present subject matter.

Referring now to FIGS. 9 through 11, a second embodiment of the present subject matter will be described. With reference to FIGS. 9 and 10, the principle differences between this alternative arrangement of the present subject matter and the first embodiment of FIGS. 5 through 8 can be seen. In particular, this second embodiment provides electrode tabs extending toward two opposing sides of the IDC 200. As illustrated in FIGS. 9 and 10, electrode tabs 214 and 216 are substantially similar to electrode tabs 114 and 116 of the IDC embodiment 100 illustrated in FIGS. 5 through 8. Moreover, anchor tabs 218 and 220 are substantially similar to anchor tabs 118 and 120 of the IDC embodiment 100 illustrated in FIGS. 5 through 8. Particular to this embodiment, however, are electrode tabs 219 and 221 that extend in a direction opposite to electrode tabs 218 and 220 and are of a sufficient length to reach the rear surface of the IDC as illustrated in FIG. 11. For convenience, the surface of the IDC on which the solder balls 240 are attached is denoted the "front" surface while the side opposite to the front side surface is denoted the "rear" surface. Such particular reference to orientation is used merely for the sake of convenience and should in no way convey limitations of the present technology.

Respective columns of electrode tabs 219 and 221 are provided to yield at least one plurality of exposed portions of a given polarity and at least one plurality of exposed portions of the opposing polarity. Each respective column of exposed portions of tabs 219 and 221 may be electrically connected together with shorting layers 250 as represented in FIG. 9. Such shorting layers can be fabricated by the electroless plating process as described herein, or they may be striped on using conventional thick film techniques. In any case, these layers 250 are typically columns similar to the plating layers 26 illustrated in FIG. 4 and perform a function similar to that of the internal vias 146 of the first embodiment of the present technology. Although not illustrated, it should be appreciated that anchor tabs as utilized with plated layers of the present technology may also be employed in the formation of layers 250. The second embodiment of the present technology is also characterized by ball limiting metallurgy 230 and solder balls 240, similar to corresponding elements 130 and 140 of the first embodiment shown in FIGS. 5 through 8 respectively.

Turning now to FIGS. 12 through 14, a third embodiment of the present technology is illustrated. The embodiment of FIGS. 12 through 14 features many selected elements of the previous embodiments but differs principally in the formation and direction of electrode tabs and anchor tabs, including the location of exposed portions thereof on the periphery of IDC 300. In the second more particular embodiment, electrode tabs 219 and 221 extend to the rear surface of the IDC 200 and are interconnected there by way of plating layer portions 250. In the third present embodiment 300, the equivalently functioning electrode tabs 319 and 321, as best seen in FIG. 13, are generally respectively configured at right angles to the direction of the electrode tabs 314 and 316 and extend toward multiple selected sides of the IDC 300. The electrode tabs 319 and 321 are of such a length as to be exposed at opposing side surfaces of IDC 300. As seen in the isometric view of FIG. 14, tabs 321 are exposed on a first selected side, while tabs 319 reach the surface of the opposing side of IDC 300 (not shown). In a manner similar to that of the previous embodiment, these electrode tabs 319 and 321 are electrically connected together respectively by way of separate plating layers 350 located on opposing sides of IDC 300. One such plating layer 350 is depicted in the side view of FIG. 12. Although not illustrated, it should be appreciated that anchor tabs as utilized with plated layers of the present technology may also be employed in the formation of layers 350. The front surface of the IDC embodiment 300 also features plating layers 330 and solder balls 340, similar to the corresponding elements of the other more particular IDC embodiments.

Each of the aforementioned embodiments discussed with respect to FIGS. 5–14 incorporate electrode tabs with varied width in order to form an exposed tab pattern of a desired shape (e.g., a discoidal pattern). When forming such multilayer devices, it should be appreciated by one of ordinary skill in the art that it is desirable to keep tight registration or alignment of each of the internal layers. If the internal electrodes are formed with the wrong width or misaligned at too great a distance in either direction, the intended locations of exposed tabs and corresponding portions of material plated thereto can be affected. In some cases, parametric variation of the various mechanical and electrical characteristics of the device can be affected. In extreme cases, misaligned electrodes can result in undesired shorting between adjacent terminations.

Figure 15:
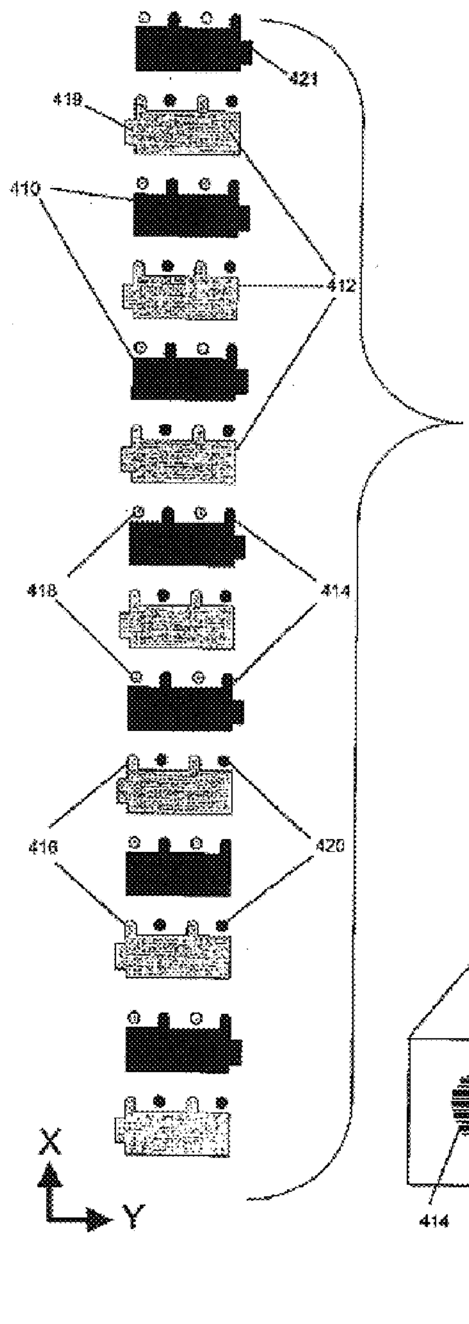
FIG. 15 illustrates an exploded plan view of an alternative electrode layer and tab configuration for use with multilayer interdigitated capacitor embodiments in accordance with the present subject matter, whereby a desired exposed termination shape is effected by the progressive cross-sectioning of the desired shape as described by the exiting tabs.

In accordance with potential concerns of some embodiments of plated termination formation, aspects of an alternative exemplary electrode layer and corresponding tab configuration for use in accordance with the present subject matter is represented in FIGS. 15 through 18, respectively. It should be appreciated that such alternative formation can be selectively employed in combination with any of the aforementioned embodiments of the present subject matter to yield still further embodiments. An exploded plan view of multiple exemplary electrode layers for combining in a successively stacked relationship within a body of dielectric material is depicted in FIG. 15 (with two-dimensional reference in the X and Y directions). Electrodes 410 alternate with electrodes 412 to provide a multilayer structure with a desired capacitance value, and the number of such electrodes 410 and 412 can vary accordingly to satisfy such desired criteria. Electrode tabs 414 extend from selected portions of respective electrodes 410 and electrode tabs 416 extend from selected portions of respective electrodes 412 and typically exit a capacitive structure to provide electrical connection to the respective electrodes. Each electrode tab 414 and 416 is preferably initially provided with the same shape, each having a generally semicircular end portion. Respective anchor tabs 418 and 420 are also provided with selected electrode layers with a shape that matches with the ends of the electrode tabs. Provision of the electrode layer and tab configuration of FIG. 15 is simpler in some aspects than the configurations of 6, 10 and 13 since all electrode tabs and anchor tabs are formed with the same general shape.

Referring still to FIG. 15, the electrode layer and corresponding tab configurations are positioned with reference to alignment in both the "X" and "Y" directions. The layers may then be successively stacked in the "Z" direction (perpendicular to the drawing). However, if the ends of the tabs are shaped in a semi-circle, and allowed to shift slightly in the "X" direction, then the subsequent dicing, or cutting, will reveal different portions of that semi-circle, and the result will be exposed tabs with different respective widths. This is shown more specifically in FIG. 16, which illustrates a detailed view of an exemplary tab 416 and different exemplary cut positions therefor. Although discussed with reference to tabs 416, it should be appreciated that similar cut positions are also applied to selected electrode tabs 414 and to anchor tabs 418 and 420.

Figure 16:
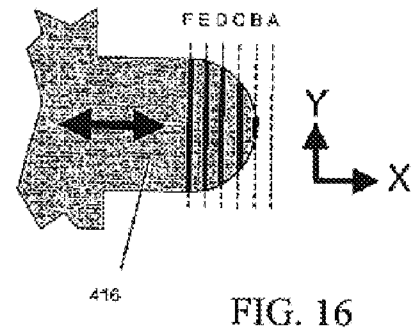
FIG. 16 shows a detailed plan view of an exemplary slicing progression for electrode tabs such as depicted in the electrode layers of FIG. 15, which yield exiting tab portions for forming a generally circular shaped plated layer.
Figure 17:
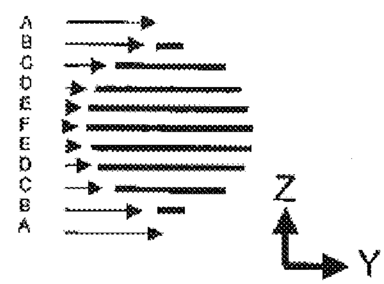
FIG. 17 shows a detailed front plan view of the resultant multilayer electrode tab configuration in accordance with the exemplary slicing progression depicted in FIG. 16, with layered electrode layers positioned to form a generally circular exposed pattern.

Referring to FIGS. 16 and 17, a first electrode position A yields no cutting or intersection of tab 416, so there will not be any portion of the tab visible on the outside of the device. This is also depicted in FIG. 17 which shows the resultant profile of all the tab cuts. At position A, there is no exposure. In FIG. 16, if the pattern is moved in an increment equal to the thickness of the substrate on which each electrode is placed, then the slightest amount of the tab will be cut at position B, and a short exposure will be seen as depicted in FIG. 17. Thus, as we progressively move the pattern in the "X" direction, each time incrementing by the substrate thickness, we will trace the shape of the semi-circle through position F. Then if we reverse the direction, we will create the other half of the circle with cuts at positions E, D, C and B, respectively. Cut A again will hide the tab ends inside. It is desirable to keep that position for many layers, in order to separate the circular patterns when multiple such patterns are desired.

Figure 18:
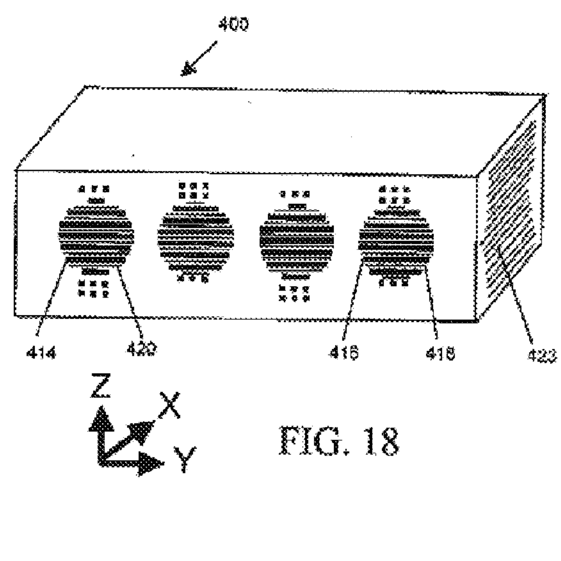
FIG. 18 illustrates a generally front perspective view of a multilayer interdigitated capacitor with an electrode layer configuration and progressively sliced electrode tabs as depicted with regard to FIGS. 15–17, respectively, in accordance with the present subject matter.

FIG. 18 illustrates a generally front perspective view of the resultant multilayer device 400, utilizing the exemplary electrode layer configuration of FIG. 15 with the varied electrode positioning represented in FIGS. 16 and 17. The intersected tabs from the progressive cuts, are seen as 414 for one polarity, and 416 for the other. Also visible in FIG. 18 are the anchor tabs which have been formed from the circular patterns 418 and 420. The resultant positioning of the exposed tab portions facilitates the deposition of a generally circular portion of plated material thereon. It should be appreciated that other formations, such as triangular shaped plated portions, may also be formed in accordance with the present subject matter either by providing tabs with varied widths or by varying the position of a triangular shaped tab, similar to the technology presented with regard to FIGS. 15–18.

In the exemplary embodiments of FIGS. 15–18, the internal electrodes are provided with side tabs 419 and 421 to which additional side terminations can be plated to provide respective connections among the opposing internal electrodes. This is similar to the side tabs of FIGS. 12–14, but are characterized by a slightly skewed alignment, as represented by portion 423 in FIG. 18, as the electrode patterns have been shifted in the "X" direction. Although the exemplary embodiment of FIGS. 15–18 is depicted with connective side terminations, it should be appreciated that other connection configurations, such as the internal vias of FIG. 5 or the rear terminations of FIG. 9, may also be employed in accordance with this exemplary embodiment.

It should be appreciated that the multilayer interdigitated capacitor embodiments presented in FIGS. 3 through 18, respectively, are presented merely as examples of the disclosed technology, including intermediate aspects thereof. In most of the examples, four or more general columns of electrodes are depicted, but a fewer or greater number of electrode columns are possible, depending on the desired component configuration. It is possible to form plated terminations along any selected portion of any selected component side in accordance with the disclosed technology. Such plated terminations may include a single layer of plated conductive material, resistive material, or semiconductive material, or a multilayer combination of selected of such materials.

The exemplary embodiments discussed above have utilized the subject plating technique to form termination features. The same technology can be used for other useful electronic purposes, as can be seen in the following example. FIGS. 19 through 21 describe the construction of a spiral-shaped inductor that can be formed using the disclosed plating process. FIG. 19 shows an exploded plan view of exemplary layers which may be stacked and positioned in registry with respect to a virtual circle 562. Each layer consists of a portion of dielectric material 560, and may further include a tab 564*a*–564*h* (hereafter collectively referred to as 564) printed such that it intersects the virtual circle 562. At a later time, the virtual circle location will be drilled to form an actual cylindrical hole through the multilayer component.

The plurality of tabs in FIG. 19 are variously depicted at different positions around the virtual circle 562 relative to the direction indicated by reference arrow 555. A first layer (the bottommost layer illustrated in FIG. 19) includes a tab portion 564*a'* that is positioned generally in the same direction as reference arrow 555. A second layer includes a tab portion 564*b* that is positioned about forty-five degrees clockwise from reference direction 555. Each subsequent patterned layer rotates the tab feature 564 an additional forty-five degrees clockwise from the tab direction of the previous layer, eventually completing a full rotation, with a layer having another tab 564*a* positioned at reference direction 555. After such layers are stacked, they are laminated with a blank cover layer having no tab feature. A hole may then be drilled within the virtual circle to expose each tab portion within the generally cylindrical hole.

FIG. 20 provides a skewed perspective of such a multilayer configuration after the layers of FIG. 19 are successively stacked in order on the same virtual circle alignment. The perspective is warped for illustrative convenience to show how the sectioned tabs may look when peering downward through the drilled hole. Each tab 564 is exposed to trace a spiral downward from the top 580 of hole 562, to the bottom 582 of hole 562. The columnar hole usually has the same diameter all the way through the laminate. After the part is fired, the inside of the hole can be exposed to the electroless copper, as described previously, and the tabs will become joined in a continuous path, seen as 584 in FIG. 21. It should be appreciated that other plating solutions and techniques as disclosed herein may also be used to form the plated spiral 584.

With regard to the exemplary embodiment of FIGS. 19–21, it should be recognized that although we show the tabs 564 as isolated strips, for the sake of drawing simplicity, provisions may typically be needed for electrically contacting the respective end tabs 564*a* for the purpose of connecting the resultant inductor to other parts of the circuit, and for temporarily connecting the other tabs 564*b*–564*h* for plating should the part be designed such that electroless copper will not bridge.

It should be further appreciated that a number of variations could be made to the exemplary configuration illustrated in FIGS. 19–21. For example, we have shown eight tab segments joined to make a single turn spiral. A single turn could be made with just two tab patterns, as well. Further, it is generally desired to have maximum inductance, which requires multiple turns. This can be easily accomplished with the disclosed technique by decreasing the number of tab segments per rotation, or increasing the number of layers, or both. As a practical matter, since the electroless plating technique has a resolution limit, four tab segments is about the minimum number when working with material that is about ten microns thick. That allows bridging to occur over the ten microns, but isolates itself for the forty micron separations between each adjacent spiral turns.

A related advantage of the disclosed plating technology relative to the formation of inductive components is that additional copper (or silver or other good conductor) can be plated over the spiral path to increase the "Q" factor, a measure of inductor performance. One could even place a magnetic plug into the hole 562, to increase the inductance even further.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed:

1. A multi-layer electronic component, comprising:

a plurality of insulating substrates each having an upper and a lower surface, said plurality of insulating substrates being delimited laterally by edges;

a plurality of electrodes interleaved between said plurality of insulating substrates, said plurality of electrodes characterized by having tab portions thereof with respectively varied widths exposed along at least one edge of said plurality of insulating substrates; and at least one layer of plated termination material connecting selected of said tab portions.

2. A multi-layer electronic component as in claim 1, wherein said at least one layer of plated termination material is formed in a generally discoidal configuration.

3. A multi-layer electronic component as in claim 1, further comprising:

a plurality of electrically isolated anchor tabs interspersed among said plurality of insulating substrates, said anchor tabs characterized by having respectively varied width portions thereof exposed at least one edge of said plurality of insulating substrates.

4. A multi-layer electronic component as in claim 3, wherein said at least one layer of plated termination material connects selected of said exposed tab portions of selected of said plurality of electrodes and selected of the exposed portions of said plurality of electrically isolated anchor tabs.

5. A multi-layer electronic component as in claim 3, wherein selected of said exposed tab portions of said selected electrodes and selected of said plurality of electrically isolated anchor tabs are aligned in a column at selected edges of said plurality of insulating substrates.

6. A multi-layer electronic component as in claim 3, wherein said at least one layer of plated termination material comprises a metallic conductive material and the exposed portions of the electrode tabs are configured to guide the formation of said at least one layer of plated termination material to directly provide ball limiting metallurgy.

7. A multi-layer electronic component as in claim 3, wherein the exposed tab portions of said electrodes and the exposed portions of said anchor tabs are spaced one from another such that said tabs act as nucleation and guide points for the at least one layer of plated termination material.

8. A multi-layer electronic component as in claim 1, wherein said at least one layer of plated termination material comprises a metallic conductive material, a resistive material, or a semiconductive material.

9. A multi-layer electronic component as in claim 1, wherein said at least one layer of plated termination material comprises a plurality of layers of electrically diverse material.

10. A multi-layer electronic component as in claim 9, wherein said plurality of layers of electrically diverse material comprise at least a layer of resistive material sandwiched between layers of conductive material.

11. A multi-layer electronic component, comprising:

a plurality of dielectric layers, each of said plurality of dielectric layers being delimited laterally by edges;

a plurality of electrode layers interleaved between said plurality of dielectric layers, selected ones of said plurality of electrode layers having respectively varied width tab portions exposed at selected edges of said plurality of dielectric layers;

a plurality of electrically isolated anchor tabs with respectively varied widths interspersed among and exposed at selected edges of selected of said plurality of dielectric layers; and at least one termination layer connecting exposed portions of selected of said plurality of electrically isolated anchor tabs and exposed tab portions of selected of said plurality of electrode layers.

12. A multi-layer electronic component as in claim 11, further comprising a plurality of termination layers, wherein selected of said plurality of termination layers connect selected of said exposed varied width tab portions of selected of said plurality of electrodes and selected of said plurality of electrically isolated varied width anchor tabs.

13. A multi-layer electronic component as in claim 12, wherein selected of said exposed varied width tab portions of said selected of said electrode layers and selected of said plurality of electrically isolated varied width anchor tabs are aligned in columns at selected edges of said plurality of dielectric layers.

14. A multi-layer electronic component as in claim 11, wherein said at least one termination layer is formed in a generally-discoidal configuration.

15. A multi-layer electronic component as in claim 11, wherein the exposed varied width tab portions and the exposed varied width anchor tabs are spaced one from another such that such tabs act as nucleation and guide points for the at least one termination layer.

16. A multi-layer electronic component as in claim 15, wherein said at least one termination layer comprises a metallic conductive material, a resistive material, or a semiconductive material.

17. A multi-layer electronic component as in claim 15, wherein said at least one termination layer comprises a metallic conductive material and the exposed portions of the electrode tabs are configured to guide the formation of the at least one termination layer to directly provide ball limiting metallurgy.

18. A multi-layer electronic component as in claim 15, wherein said at least one termination layer comprises a plurality of layers of electrically diverse material.

19. A multi-layer electronic component as in claim 18, wherein said plurality of layers of electrically diverse material comprise at least a layer of resistive material sandwiched between layers of conductive material.

20. A multi-layer electronic component, comprising:

a plurality of dielectric layers;

a plurality of electrically conductive tabs spirally aligned and interspersed among said plurality of dielectric layers; and a layer of termination material connecting said plurality of tabs.

21. A multi-layer electronic component as in claim 20, wherein said layer of termination material comprises a metallic conductive material.

22. A multi-layer electronic component, comprising:

a plurality of stacked dielectric layers;

a plurality of conductive tabs positioned at selected locations on said plurality of stacked dielectric layers; and at least one layer of termination material connecting selected of said plurality of conductive tabs;

wherein said plurality of conductive tabs are positioned at selected edges of said plurality of dielectric layers; and wherein the plurality of conductive tabs are varied in width to form a predetermined geometric pattern.

23. A multi-layer electronic component as in claim 22, wherein said predetermined geometric pattern is a pattern selected from the group consisting of, a generally discoidal configuration, a generally triangular configuration and a generally rectangular pattern.

24. A multi-layer electronic component as in claim 22, wherein the geometric pattern is generally circular and the termination material connecting selected of the conductive tabs forms ball limiting metallurgy for the multi-layer component.

25. A multi-layer electronic component, comprising:

a plurality of stacked dielectric layers;

a plurality of conductive tabs positioned at selected locations on said plurality of stacked dielectric layers; and at least one layer of termination material connecting selected of said plurality of conductive tabs;

wherein said plurality of conductive tabs are positioned at selected edges of said plurality of dielectric layers; and wherein said plurality of conductive tabs are positioned at selected angular positions around a cylindrical via piercing a central location of said plurality of dielectric layers.

26. A multi-layer electronic component as in claim 25, wherein the termination material connecting selected of the conductive tabs is a metallic material and forms a spiral inductor within said cylindrical via.

* * * * *

UNITED STATES PATENT AND TRADEMARK OFFICE

CERTIFICATE OF CORRECTION

PATENT NO. : 6,982,863 B2
DATED : January 3, 2006
INVENTOR(S) : Andrew P. Ritter et al.

It is certified that error appears in the above-identified patent and that said Letters Patent is hereby corrected as shown below:

Title page,
Item [76], Inventors, should read as follows.
-- Andrew P. Ritter, Surfside Beach, SC (US); John L. Galvagni, Surfside Beach, SC (US); Jason MacNeal, Georgetown, SC (US); Robert Heistand II, Myrtle Beach, SC (US); Sriram Dattaguru, Myrtle Beach, SC (US) --.
Item [56], References Cited, U.S. PATENT DOCUMENTS, should read as follows:
-- 6,661,638 12/2003 Jackson et al. --.

Column 19,
Line 23, should read:
22. A multi-layer electronic component, comprising:
a plurality of stacked dielectric layers;
a plurality of conductive tabs positioned at selected locations on said plurality of stacked dielectric layers; and
at least one layer of termination material connecting selected of said plurality of conductive tabs;
wherein said plurality of conductive tabs are positioned at selected edges of said plurality of dielectric layers and are aligned in one or more respective columns; and
wherein the plurality of conductive tabs are varied in width among each said respective column to form a predetermined geometric pattern.

Column 20,
Line 3, should read:
23. A multi-layer electronic component as in claim 22, wherein said predetermined geometric pattern is a pattern selected from the group consisting of a generally discoidal configuration and a generally triangular configuration.

Signed and Sealed this

Twenty-third Day of May, 2006

JON W. DUDAS
*Director of the United States Patent and Trademark Office*